A. E. WESTBURG & G. H. BATES.
COMBINED SCOOP AND SIFTER.
APPLICATION FILED JULY 27, 1908.
933,212.
Patented Sept. 7, 1909.
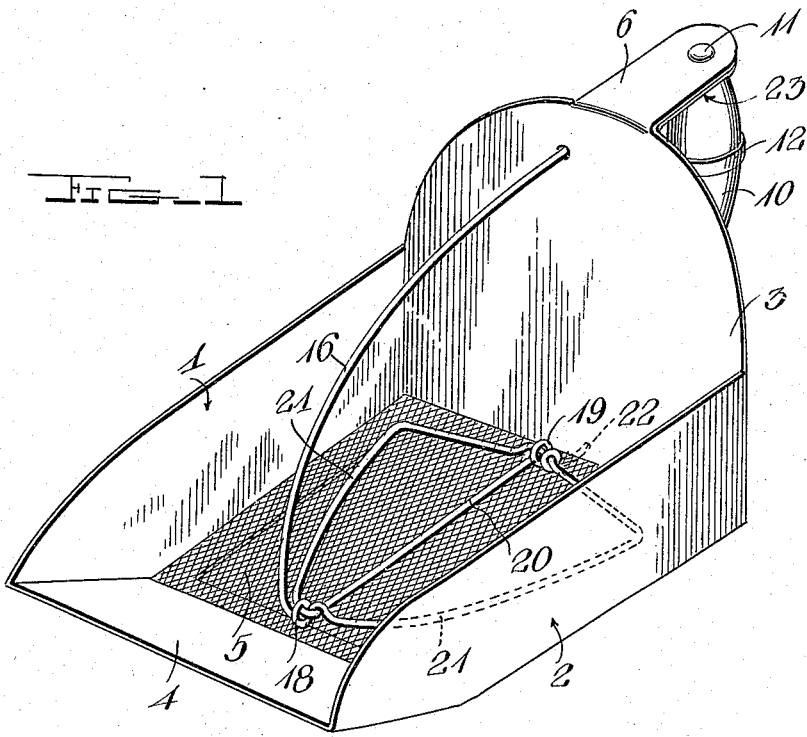
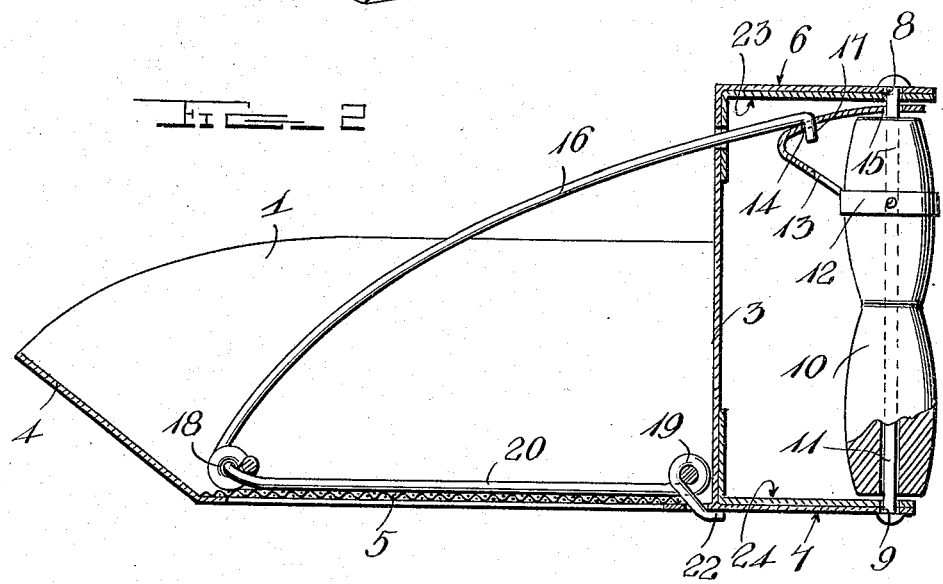

UNITED STATES PATENT OFFICE.

ARTHUR E. WESTBURG AND GEORGE H. BATES, OF JAMESTOWN, NEW YORK.

COMBINED SCOOP AND SIFTER.

933,212.

Specification of Letters Patent.

Patented Sept. 7, 1909.

Application filed July 27, 1908. Serial No. 445,584.

*To all whom it may concern:*

Be it known that we, ARTHUR E. WESTBURG and GEORGE H. BATES, citizens of the United States, residing at Jamestown, in the county of Chautauqua and State of New York, have invented certain new and useful Improvements in a Combined Scoop and Sifter; and we do declare the following to be a full, clear, and exact description of the invention, such as will enable others skilled in the art to which it appertains to make and use the same.

This invention relates to a flour sifter.

One of the objects of our invention is the construction of a combined flour scoop and flour sifter adapted to be readily inserted in a mass of flour and to quickly and efficiently sift said flour.

Another object of our invention is the construction of a combined flour sifter and scoop capable of being used in the making of bread stuffs, and to allow the use of one hand in regular work.

With these and other objects in view, the invention consists of certain novel features of construction, combination and arrangement of parts, as will be more fully described and particularly pointed out in the appended claims.

In the accompanying drawings, Figure 1 is a perspective view of our improved flour scoop and flour sifter; and Fig. 2 is a sectional view thereof.

Our improved flour scoop or sifter comprises a body portion formed with sides 1 and 2, a back 3 and an inclined front 4. The body portion is provided with a screened bottom 5 which may be constructed of any woven fabric and which is secured to the body portion by means of soldering or rivets. The sides, front and back of the body portion preferably extend along the base portions so as to form a connection for the screen 5. The back 3 is formed with extensions 6 and 7 and said extensions are formed with apertures 8 and 9. The extensions 6 and 7 extend at right angles to the back 3 and a handle 10 is connected thereto by means of a rod 11. The handle 10 is provided with a strap 12 exteriorly connected thereto and said strap is formed with an extension 13, said extension being provided with apertures 14 and 15.

A shaker comprising an outwardly inclined brace bar 16 is mounted on the scoop and is formed with a bent end portion 17 extending through aperture 14 of extension 13, a twisted portion 18 and looped portion 19, said looped portion terminating in a central bar 20 which is formed with arms 21, which are adapted to move into the corners of the sifter so as to dislodge material therein, the central bar being also formed with a bent end 22 which extends through the bottom of the body portion.

The scoop of our improved invention can be formed in any desired pattern and the construction of our improved shaker may be modified as experience may direct. When combined, the shaker will occupy a position on the screen bottom 5 and may be moved or reciprocated on said bottom by means of handle 10 having connections with the inclined shaker bar 16.

When an operator desires to secure a quantity of flour from a bin or other source of supply, the scoop is inserted in the flour or material and withdrawn and when he desires to sift the flour contained in the scoop, he may do so by simply turning the handle 10, upon its screws or by holding the handle firmly in his hand and swinging the scoop from side to side. Either of these movements will cause the shaker to move against the screened bottom 5 thereby forcing or sifting the flour from the scoop.

It is a well known fact that in the sifting of flour and similar materials, that the same have a tendency to form into piles above the sifting screen with the result that the material will not readily sift therethrough. In the combined scoop in a sifter designed by us, this massing tendency of the flour or material is effectively prevented by the action of the inclined arm 16 upon said flour or material. The arm 16, which extends at the incline above the bottom being connected with the forward end of the shaker, serves to effectively brace said shaker so that it will freely move through the material. This function becomes very important when heavy materials are to be sifted. The strap 12 is connected exteriorly to the handle so that it will be effectively secured thereto against displacement and results which would quickly occur if the same was directly secured to the rod 13.

It will be seen by the drawings and the foregoing description that our improved flour sifter and scoop may be constructed with a few simple parts and sold at a small cost and when in use will give efficient service. The extensions 6 and 7 may be reinforced by means of braces 23 and 24. Our improved flour sifter and scoop may be constructed of any desired material such as tin, aluminum, wood or other materials. The construction of our improved sifter and scoop is such that a person may efficiently manipulate the same with one hand. The importance of this feature will be readily understood by those skilled in the art. In mixing large batches of dough, it is often desired by the person so engaged that a fresh quantity of flour be secured from a bin to sift on the work. With our invention it is possible for a person to use one of their hands continuously forming or mixing the dough, and with the other, secure a quantity of flour and sift the same over said dough. The shaker of our improved device is preferably formed of one piece of material.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of our invention, what we claim as new and desire to secure by Letters-Patent is:—

1. A combination with a scoop formed with a screen bottom of a shaker mounted on the scoop, said shaker being provided with an arm extending at an incline, rearwardly and above the bottom and said scoop being formed with extensions adapted to support a handle, braces connected to the extensions and a handle secured to the braces and the extensions and a strap secured exteriorly to the handle for rocking the inclined arm.

2. The combination with a scoop provided with a screened bottom, of handle supporting extensions formed integral with said scoop, a handle pivotally held between the extensions, a strap arm secured exteriorly to the handle, and a shaker formed from a single section of wire and having a forwardly extending inclined arm, the rear end of which is pivotally secured to the strap, a central longitudinal shaker bar connected to the inclined arm, a pair of bowed integral side arms connected to the longitudinal shaker bar, the terminal of which pivotally extends through the bottom of the scoop.

3. The combination with a scoop provided with a screened bottom, of handle supporting extensions formed integral with said scoop, a handle pivotally held between the extensions, a strap arm comprising a forwardly bowed portion and an embracing loop portion secured exteriorly to the handle, a shaker arm operatively connected with the strap arm formed of a single section of wire and having a forwardly extending inclined brace arm, a single longitudinal rearwardly extending shaker bar connected at its forward end with the inclined arm, and a pair of bowed integral side arms terminating in an end which pivotally extends through the bottom of the scoop connected to the longitudinal shaker bar.

In testimony whereof we have hereunto set our hands in presence of two subscribing witnesses.

ARTHUR E. WESTBURG.
GEORGE H. BATES.

Witnesses:
JOHN E. WHEELER,
DELFORD A. ARIOD.